(12) United States Patent
Rafalik et al.

(10) Patent No.: US 8,910,916 B2
(45) Date of Patent: Dec. 16, 2014

(54) SECURITY MOUNTING POLE APPARATUS AND METHOD OF USE

(76) Inventors: Joseph Karl Rafalik, Redondo Beach, CA (US); Justin Wayne D'Arcy, Redondo Beach, CA (US); Engelbert Bautista Ebalo, Norwalk, CA (US)

( * ) Notice: Subject to any disclaimer, the term of this patent is extended or adjusted under 35 U.S.C. 154(b) by 6 days.

(21) Appl. No.: 13/549,378

(22) Filed: Jul. 13, 2012

(65) Prior Publication Data

US 2013/0099078 A1    Apr. 25, 2013

Related U.S. Application Data

(60) Provisional application No. 61/550,288, filed on Oct. 21, 2011.

(51) Int. Cl.
*F16M 13/00* (2006.01)
*F16M 13/02* (2006.01)

(52) U.S. Cl.
CPC ....... *F16M 13/027* (2013.01); *F16M 2200/065* (2013.01); *F16M 2200/08* (2013.01)
USPC .......................................... 248/551; 248/343

(58) Field of Classification Search
USPC ................. 248/551, 317, 342, 343; 52/220.6, 52/220.7, 833, 843, 844, 849, FOR. 102, 52/834, 836
See application file for complete search history.

(56) References Cited

U.S. PATENT DOCUMENTS

| | | | |
|---|---|---|---|
| 3,208,702 A * | 9/1965 | Rowe | 248/539 |
| 3,667,405 A * | 6/1972 | Roach, Jr. | 109/51 |
| 4,268,099 A | 5/1981 | Clausen | |
| 4,289,242 A | 9/1981 | Kenyon | |
| 4,474,300 A | 10/1984 | Entis | |
| 4,964,606 A | 10/1990 | Beam | |
| 5,007,259 A | 4/1991 | Mellard | |
| 5,009,334 A | 4/1991 | Bodkins | |
| 5,135,197 A | 8/1992 | Kelley | |
| 5,485,930 A | 1/1996 | Rushing | |
| 5,729,952 A * | 3/1998 | Dahl | 403/269 |
| 5,865,416 A | 2/1999 | Hanaway | |
| 6,039,498 A | 3/2000 | Leyden et al. | |
| 6,042,068 A | 3/2000 | Tcherny | |
| 6,389,774 B1 * | 5/2002 | Carpenter | 52/585.1 |
| 6,606,887 B1 | 8/2003 | Zimmer | |
| 6,644,927 B2 * | 11/2003 | Bucher et al. | 416/244 R |
| 6,708,940 B2 | 3/2004 | Ligertwood | |
| 7,003,921 B2 * | 2/2006 | Hisano | 52/223.9 |
| 7,029,133 B2 | 4/2006 | Challis | |
| 7,048,246 B2 | 5/2006 | Leyden | |
| 7,156,359 B2 | 1/2007 | Dittmer | |
| 7,226,174 B2 | 6/2007 | Rodems | |
| 7,357,738 B2 * | 4/2008 | White et al. | 473/481 |
| 7,387,003 B2 | 6/2008 | Marszalek | |
| 7,441,696 B2 | 10/2008 | Bolles | |
| 7,481,410 B2 | 1/2009 | Umberg | |
| 7,484,628 B2 | 2/2009 | Schneider | |
| 7,503,536 B2 | 3/2009 | Friederich | |
| 7,533,784 B2 | 5/2009 | Vlastakis | |

(Continued)

*Primary Examiner* — Alfred J Wujciak

(74) *Attorney, Agent, or Firm* — John D. Tran; Rhema Law Group, P.C.

(57) ABSTRACT

A security mounting pole apparatus comprising a pipe having an outer surface and an inner surface defining a longitudinal bore therethrough, the pipe having a first end and an opposite second end, and one or more reinforcing members disposed in the longitudinal bore of the pipe.

14 Claims, 3 Drawing Sheets

(56) References Cited

U.S. PATENT DOCUMENTS

| | | |
|---|---|---|
| 7,578,493 B2 | 8/2009 | Lovell |
| 7,611,118 B2 | 11/2009 | O'Neill |
| 7,758,001 B2 | 7/2010 | Bouissiere |
| 7,971,676 B2 | 7/2011 | Dusa, II |
| 7,988,119 B2 | 8/2011 | Dittmer |
| 8,002,232 B2 | 8/2011 | Meislahn |
| 8,100,373 B2 | 1/2012 | Meyer |
| 8,484,915 B1 * | 7/2013 | Abbas et al. ............ 52/223.4 |
| 2001/0038062 A1 | 11/2001 | Galant |
| 2005/0051696 A1 | 3/2005 | Oberpichler |
| 2006/0228170 A1 * | 10/2006 | Joo ............ 403/286 |
| 2008/0029679 A1 | 2/2008 | Benedetti |
| 2008/0107527 A1 * | 5/2008 | Gajewski ............ 416/5 |
| 2008/0163653 A1 | 7/2008 | Anderson |
| 2008/0192408 A1 | 8/2008 | Edward |
| 2008/0304919 A1 * | 12/2008 | Coyle ............ 405/250 |
| 2009/0021653 A1 | 1/2009 | Kerr |
| 2009/0127422 A1 | 5/2009 | Kitazawa |
| 2011/0121151 A1 | 5/2011 | Stifal |
| 2011/0158765 A1 | 6/2011 | Smith |

* cited by examiner

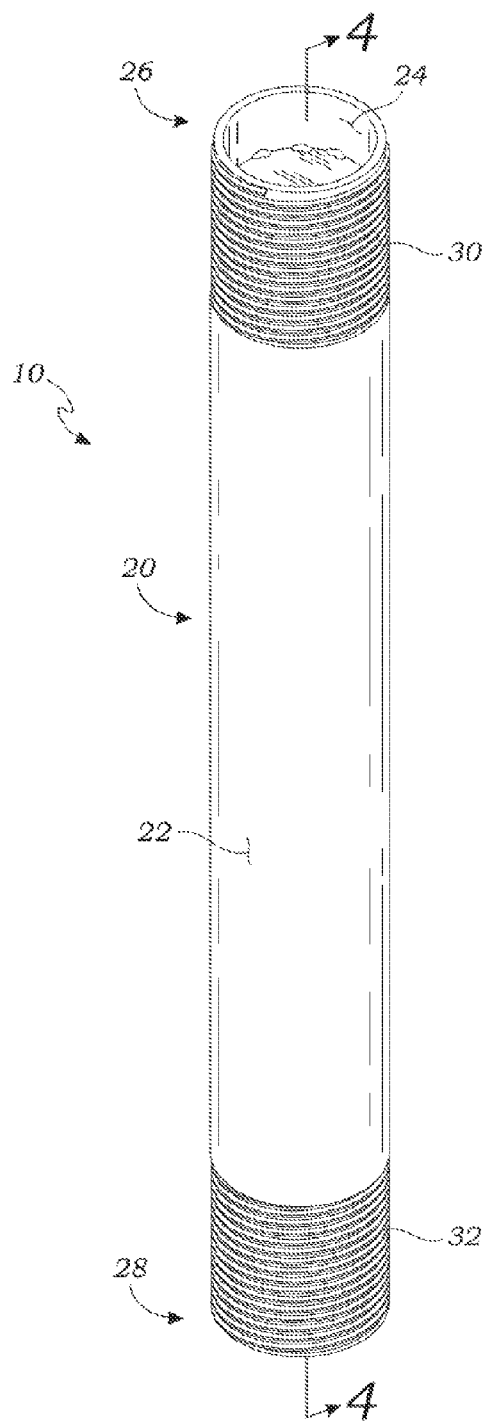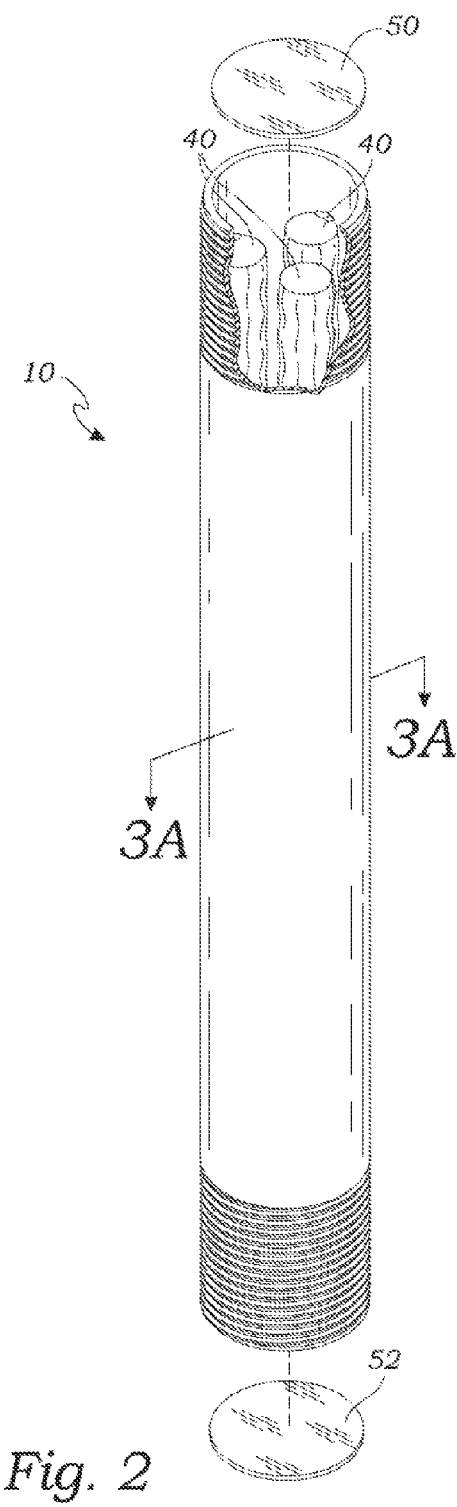
Fig. 1
Fig. 2

SECURITY MOUNTING POLE APPARATUS AND METHOD OF USE

RELATED APPLICATIONS

This application claims priority and is entitled to the filing date of U.S. Provisional application Ser. No. 61/550,288 filed on Oct. 17, 2011, and entitled "Security Mounting Pole for Display Devices." The contents of the aforementioned application are incorporated by reference herein.

INCORPORATION BY REFERENCE

Applicant(s) hereby incorporate herein by reference any and all U.S. patents and U.S. patent applications cited or referred to in this application.

BACKGROUND OF THE INVENTION

1. Field of the Invention

Aspects of this invention relate generally to security devices, and more particularly to mounting hardware having security features.

2. Description of Related Art

The following art defines the present state of this field:

Currently there are no known reinforced or theft-deterrent projector and/or display mounting poles. Projectors and/or displays are often stolen from places such as schools, businesses, malls, and airports and cost a great deal of money to replace if it can be afforded to replace them. The only known levels of protection for display devices are visual surveillance, such as by cameras or security guards, or security mounts that attach directly to the display device. There are currently no reinforced poles that are used to bridge the gap between the display devices and the surface from which the display device is suspended or to which it is mounted. Aspects of the present invention fulfill these needs and provide further related advantages as described in the following summary.

SUMMARY OF THE INVENTION

Aspects of the present invention teach certain benefits in construction and use which give rise to the exemplary advantages described below.

In an exemplary embodiment of the invention, a security mounting pole apparatus comprises a pipe having an outer surface and an inner surface defining a longitudinal bore therethrough, the pipe having a first end and an opposite second end, and one or more reinforcing members disposed in the longitudinal bore of the pipe.

A primary objective inherent in the above-described apparatus and method of use is to provide advantages not taught by the prior art.

Another objective is to provide such an apparatus that deters cutting of the pipe.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1 is a perspective view of an exemplary embodiment of the invention;

FIG. 2 is an exploded perspective view thereof;

Features, elements, and aspects of the invention that are referenced by the same numerals in different figures represent the same, equivalent, or similar features, elements, or aspects, in accordance with one or more embodiments.

DETAILED DESCRIPTION OF THE INVENTION

Figure 3A:
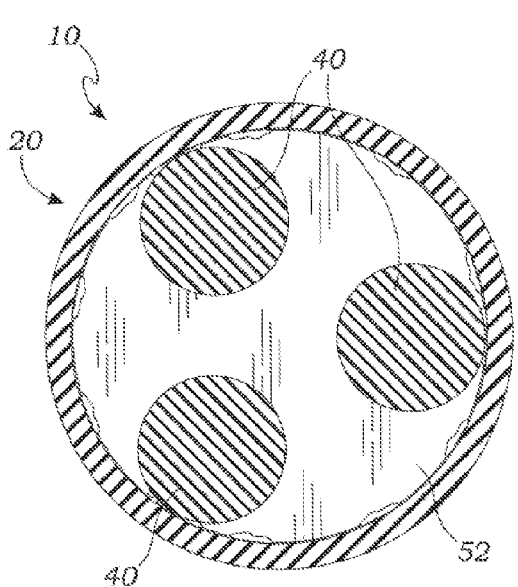
FIG. 3A is an enlarged cross-sectional view thereof taken along line 3A-3A in FIG. 2.

The above described drawing figures illustrate aspects of the invention in at least one of its exemplary embodiments, which are further defined in detail in the following description.

Broadly, aspects of the present invention generally relate to a security mounting pole apparatus configured for deterring theft of an associated display device. The security mounting pole apparatus provides a passive solution for an added level of security for display devices, such as projectors and flat panel displays, by acting against cutting tools to either prevent or discourage theft involving cutting a mounting pole in two or in half. Additional reinforcement in the pole itself can dull or break a cutting blade, create noise, and add time to the cutting process during an attempted theft. While a particular configuration of such a security mounting pole apparatus is thus shown and described herein, it will be appreciated that the apparatus may take a number of other forms, including geometry, material, and overall configuration, without departing from the spirit and scope of the invention.

Turning now to FIG. 1, there is shown a perspective view of an exemplary embodiment of a security mounting pole apparatus 10, and in FIG. 2 there is an exploded perspective view thereof. As can be seen, the apparatus 10 comprises, in the exemplary embodiment, a pipe 20 having an outer surface 22 and an inner surface 24 defining a longitudinal bore therethrough. The pipe 20 further has a first end 26 and an opposite second end 28. First and second external threads 30, 32, may be formed adjacent each of the first and second ends 26, 28, respectively, for mounting the display device 100 (FIG. 5) to one end of the pipe 20 and the opposite end to the mounting structure such as a ceiling 110 (FIG. 5) in a manner known and practiced in the art. It will be appreciated that any such means for mounting the pole apparatus 10 both to a display device and to a mounting structure, now known or later developed, may be employed in conjunction with the security mounting pole apparatus 10 of the present invention without departing from its spirit or scope, such that the exemplary external threads 30, 32 are to be understood as illustrative and non-limiting.

Figure 3B:
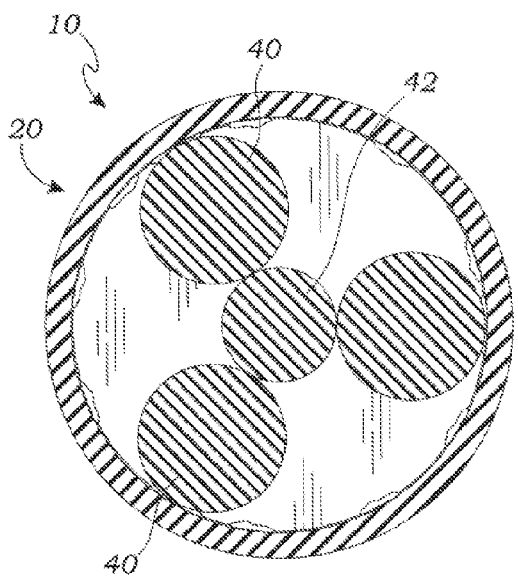
FIG. 3B is an enlarged cross-sectional view of an alternative embodiment of the invention.

With continued reference to FIGS. 1 and 2 and with further reference to the enlarged cross-sectional view of FIG. 3A, the security mounting pole apparatus 10 may further include one or more relatively rigid reinforcing members 40 disposed in the longitudinal bore of the pipe 20. In the exemplary embodiment shown, three such reinforcing members 40 are disposed in the longitudinal bore of the pipe 20, each such reinforcing member 40 being formed of "rebar," or a reinforced bar of common steel or the like, and attached to the inner surface 24 of the pipe 20, as through welding, approximately one-hundred-twenty degrees (120°) apart about the circumferential inner surface 24. Although in one present embodiment, the rebar is comprised of common steel, it should be appreciated that the rebar can be any type of reinforcement bar and be made of a plurality of materials. As such, in the exemplary embodiment, the pipe 20 is a nominal two inch (2") outside diameter with a one-eighth inch (⅛") wall, and each of the three rebar reinforcing members 40 are "#5 Imperial Bar Size" having a nominal diameter of five-eighths inch (⅝"). Again, those skilled in the art will appreciate that the size and wall thickness of the pipe 20 and the number and size of the reinforcing members 40 within the pipe 20 may vary significantly depending on the context, such that the exemplary sizes are to be understood as merely illustrative and non-limiting. For example, a security pipe according to aspects of the present invention may, instead of mounting a display device, be used for security fencing to add an added passive layer of reinforcement to fencing that is constructed with pipes, in which case the sizes may vary from those described above; numerous other contexts may apply wherein pipes are preferably reinforced according to aspects of the present invention. Back to the display device mounting context, and by way of further example, in the exemplary embodiment, alternatively as shown in FIG. 3B, a fourth reinforcing member 42 may be disposed within the bore of the pipe 20 substantially down its center or along its longitudinal axis within the pattern of the three other reinforcing members 40; such additional member 42 may be effectively "floating" within the pipe 20 or may be affixed to one or more of the other reinforcing members 40. The fourth reinforcing member 42 is shown as being relatively smaller than the other three reinforcing members 40; for example, a "#3 Imperial Bar Size" having a nominal diameter of three-eighths inch (⅜"). Once again, any number, size, combination, and orientation of such reinforcing members 40, 42 is possible in the present invention without departing from its spirit and scope. By way of further example, while a round pipe 20 is shown and described, the mounting pipe may instead be square or rectangular or of any other geometrical cross-section desired. In any such case, the appropriate or desired number of reinforcing members 40, 42, whether or not touching or affixed to the inside surface of any such pipe, may be employed for the particular context.

Figure 4:
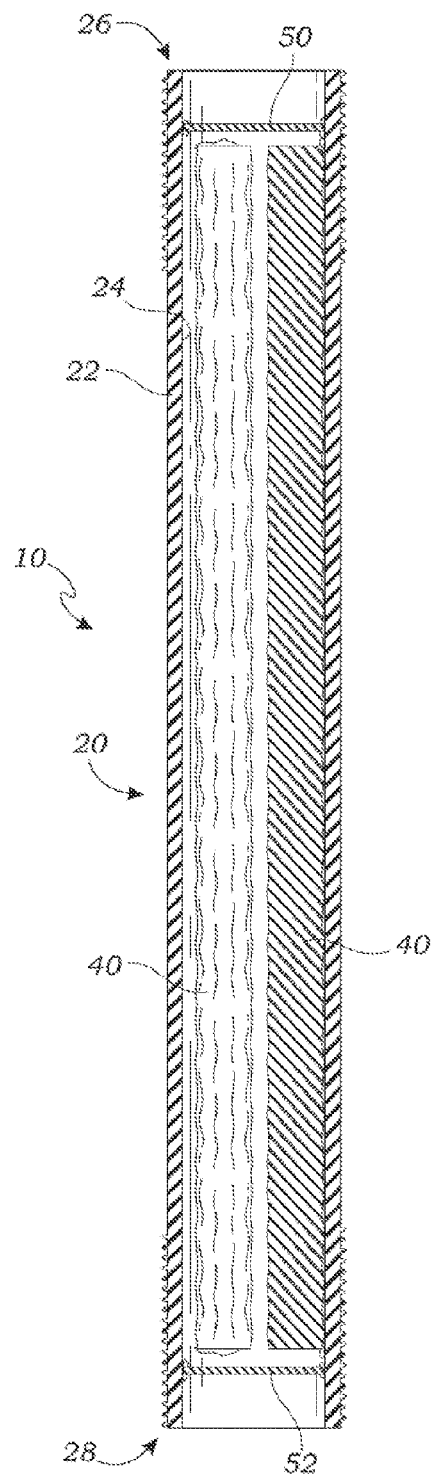
FIG. 4 is a cross-sectional view of the exemplary embodiment taken along line 4-4 in FIG. 1.

Furthermore, now with reference to the lengthwise cross-sectional view of FIG. 4, the security mounting pole apparatus 10 may include a first internal end cap 50 and a second internal end cap 52 disposed between the rebar reinforcing members 40 and the first end 26 and the second end 28 of the pipe 20, respectively. In the exemplary embodiment, the rebar reinforcing members 40 are sized relative to the pipe 20 so as to have their ends be approximately one inch (1") from each of the first and second ends 26, 28 of the pipe 20 when welded in place, or to be roughly two inches (2") shorter than the pipe 20 in overall length, whereby each end cap 50, 52 is positioned within the bore of the pipe 20 approximately three-quarter inch (¾") from the first and second ends 26, 28 of the pipe 20, or approximately one-quarter (¼") inch from the ends of the rebar reinforcing members 40. This may ensure that the rebar reinforcing members 40 are able to move but not escape if broken and should increase the ability of the rebar reinforcing members 40 to generate noise and still provide room for expansion. In one present embodiment, the ability of the rebar reinforcing members 40 to generate noise, if broken free, provides an audible alarm deterrent by creating a loud rattle inside the pole. Furthermore, a broken free rebar reinforcing members may potentially damage a would be cutting blade since the broke free rebar materials would be "free-floating" or loose and thus be more difficult to cut.

Moreover, even when viewed from the end of the pipe 20, the internal end caps 50, 52 not only help retain the rebar reinforcing members 40 but also substantially hide the bore of the pipe 20, and thus the rebar reinforcing members 40, further preventing any unwanted tampering with or visibility of the inside of the pipe 20. Accordingly, the internal end caps 50, 52 may have a surface that is substantially flat and a diameter that may be less than, greater than, or equal to the internal diameter of the pipe 20. In the exemplary embodiment, the internal end caps 50, 52 are preferably formed having a circular cross-section substantially equivalent to the inside diameter of the pipe 20, but may take another shape or size as appropriate for a particular context; specifically, the profile of the end caps 50, 52 may be selected to match the inside surface 24 or cross-section of the pipe 20, such as circular-circular, or may be configured for other combinations, such as square-circular, circular-square, triangular-circular, circular-triangular, etc., without departing from the spirit and scope of the invention. The pipe 20 and the internal end caps 50, 52 may be made of any appropriate ferrous or other material now known or later developed suitable for the structural assembly and use intended.

It will be appreciated that once assembled as shown in FIG. 1, the security mounting pole apparatus 10 according to aspects of the present invention will have little if any signs of alteration when put into use in the field, thereby not detracting from the overall appearance of the mounting pole while still offering the security advantages described herein. For example, the outer surface 22 of the pipe 20 may have the appearance of natural steel or other metal or may be painted or treated to any desired color or texture. While the exemplary method of assembly of the reinforcing members 40 and the internal end caps 50, 52 within the pipe 20 is described as welding, which further contributes to the relatively unaltered external appearance of the security mounting pole apparatus 10, it will be appreciated that any connections described herein may include any now known or later developed forms or methods of assembly, including but not limited to welds, adhesives, screws, bolts, press or interference fit, snap fit, snap-ring, compression/tension fit, and the like. Once more, those skilled in the art will appreciate that while a particular configuration of the assembled security mounting pole apparatus 10 is shown and described, the invention is not so limited, but may take numerous other forms without departing from the spirit and scope of the invention.

Figure 5:
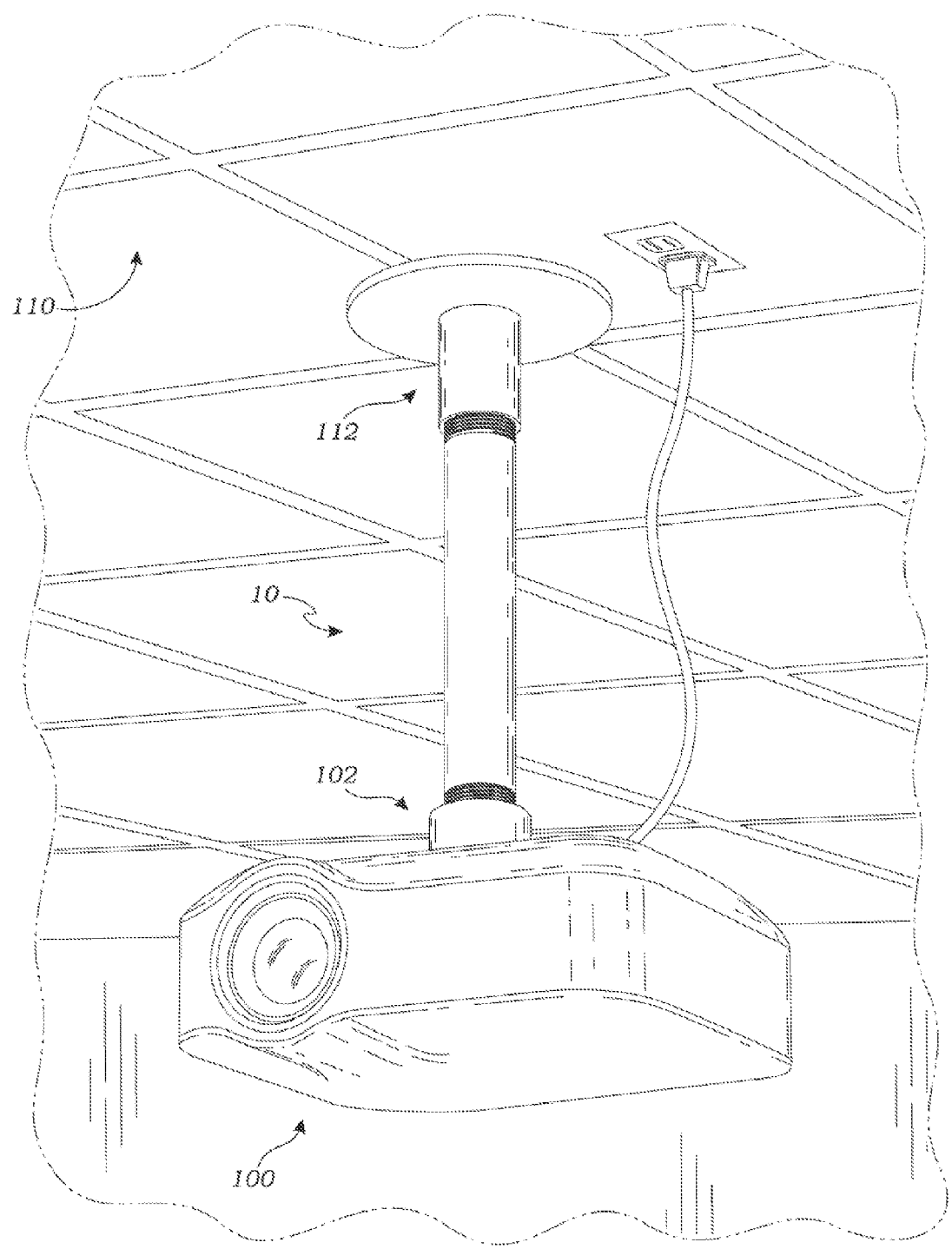
FIG. 5 is a perspective view of the exemplary embodiment in use.

Turning now to FIG. 5, in use, the security mounting pole apparatus 10 is configured to act as a suspension mechanism that may mount or attach to a suspension plate 112 installed to a ceiling 110 and to a display device mount 102 configured on the display device 100 or other such structure used to mount a projector or flat panel display or other such device. Once more, the pipe 20 of the security mounting pole apparatus 10 is in the exemplary embodiment configured with first and second external threads 30, 32 that themselves may be threadably received in appropriate internally threaded holes formed in the suspension plate 112 and display device mount 102, respectively, though those skilled in the art will again appreciate that any other mounting means between the security mounting pole apparatus 10, and the pipe 20, specifically, and the display device 100 and support structure 110, now known or later developed, may be employed. With the security mounting pole apparatus 10 so installed so as to mount any device that uses pipe as part of its mounting system and has the appropriate connection points, the display device 100 is thus securely mounted for operation. Once again, the security mounting pole apparatus 10 so configured and installed may function as a cutting inhibitor. When an attempt is made to cut through the pipe 20, the blade of the cutting device (not shown) will at some point encounter the one or more reinforcing members 40 within the pipe 20, which may damage the cutting blade. When the reinforcing member(s) 40 are secured to the inside surface 24 of the pipe 20, the cutting blade must then encounter such member(s) 40, thereby again dulling, damaging or otherwise inhibiting the cutting blade. And even if any connection that holds the reinforcing member(s) 40 to the pipe 20 breaks loose, the action of the reinforcing member(s) 40 moving around may still dull or damage the cutting blade surface, break the blade itself, or simply cause so much noise as to discourage further attempts to cut through the pipe 20 and steal the associated display device 100. In the embodiment as shown in FIGS. 1-4 wherein the reinforcing members 40 are evenly spaced along the inside surface 24 of the pipe 20, this further aids in security by increasing the likelihood that a cutting blade will encounter one of the reinforcing members 40 early and often in the cutting process, again potentially dulling, breaking, or otherwise damaging the cutting blade or tool and thereby discouraging the attempted theft.

To summarize, regarding the exemplary embodiments of the present invention as shown and described herein, it will be appreciated that a security mounting pole apparatus is disclosed and configured for use in connection with display device mounting and other security contexts. Because the principles of the invention may be practiced in a number of configurations beyond those shown and described, it is to be understood that the invention is not in any way limited by the exemplary embodiments, but is generally directed to a security pipe apparatus and is able to take numerous forms to do so without departing from the spirit and scope of the invention. Furthermore, the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A security mounting pole apparatus for suspending a projector/display device from a mounting structure, comprising:
    a pipe having an outer surface and an inner surface defining a longitudinal bore therethrough, the pipe having a first end and an opposite second end, wherein first and second external threads are formed adjacent each of the first and second ends of the pipe, respectively and wherein the first end is adapted to be mounted on the projector/display device and the second end is adapted to be fixed to the mounting structure;
    one or more reinforcing members disposed in the longitudinal bore of the pipe; and
    a first internal end cap and a second internal end cap disposed between the one or more reinforcing members and the first end and the second end of the pipe, respectively, the first and second internal end caps cooperating with the pipe in retaining the one or more reinforcing members within the bore, whereby cutting of the pipe and theft of the projector/display device is deterred.

2. The apparatus of claim 1 wherein:
    at least one of the one or more reinforcing members is welded to the inner surface of the pipe in a substantially longitudinal orientation so as to leave approximately a one inch space between the at least one of the one or more reinforcing members and the respective first and second ends of the pipe; and
    the first and second internal end caps are welded within the bore of the pipe to the inner surface approximately three-quarter inch from the respective first and second ends of the pipe, whereby an approximately one-quarter inch space is formed between the at least one of the one or more reinforcing members and the respective first and second internal end caps such that the one or more reinforcing members are provided room for expansion and are able to move but not escape if broken and so generate noise and still deter cutting of the pipe.

3. The apparatus of claim 2 wherein:
    the pipe is annular in cross-section; and
    three reinforcing members are welded to the inner surface of the pipe substantially one-hundred-twenty degrees apart about the annular inner surface.

4. The apparatus of claim 3 further comprising a fourth reinforcing member positioned within the pattern of the three reinforcing members substantially along the axis of the pipe.

5. The apparatus of claim 4 wherein the reinforcing members are rebar.

6. The apparatus of claim 1 wherein:
    the mounting structure is a ceiling configured with a suspension plate configured to threadably receive the first external threads of the pipe; and
    the projector/display device is configured with a display device mount configured to threadably receive the second external threads of the pipe.

7. A security mounting pole apparatus for suspending a projector/display device from a mounting structure, comprising:
    a pipe having an outer surface and an inner surface defining a longitudinal bore therethrough, the pipe having an annular cross-section with a first end and an opposite second end, the pipe being formed on the outer surface with first external threads substantially at the first end and with second external threads substantially at the second end, wherein the first end is adapted to be mounted on the projector/display device and the second end is adapted to be fixed to the mounting structure;
    three reinforcing members welded to the inner surface of the pipe substantially one-hundred-twenty degrees apart about the annular inner surface, whereby cutting of the pipe is deterred; and
    substantially continuous first and second internal end caps disposed between the reinforcing members and the first and second ends of the pipe, respectively, in substantially abutting relationship to the inner surface of the pipe, the first and second internal end caps cooperating with the pipe in completely retaining the three reinforcing members within the bore while not interfering with the first and second external threads of the pipe.

8. The apparatus of claim 7 further comprising a fourth reinforcing member positioned within the pattern of the three reinforcing members substantially along the axis of the pipe.

9. The apparatus of claim 8 wherein the reinforcing members are rebar.

10. The apparatus of claim 7 wherein the first and second internal end caps are welded within the bore of the pipe to the inner surface so as to form a space between the reinforcing members and the first and second internal end caps such that the reinforcing members are provided room for expansion and are able to move but not escape if broken and so generate noise and still deter cutting of the pipe.

11. A security mounting pole apparatus for suspending a projector/display device from a mounting structure, comprising:

A pipe having an outer surface and an inner surface defining a longitudinal bore therethrough, the pipe having a first end and an opposite second end, the pipe further having first and second external threads formed in the outer surface adjacent each of the first and second ends of the pipe, respectively;

one or more reinforcing members disposed in the longitudinal bore of the pipe; and a first internal end cap and a second internal end cap disposed between the one or more reinforcing members and the first end and the second end of the pipe, respectively, the first and second internal end caps cooperating with the pipe in retaining the one or more reinforcing members within the bore, wherein:

the mounting structure is configured with a suspension plate configured to threadably receive the first external threads of the pipe; and the projector/display device is configured with a display device mount configured to threadably receive the second external threads of the pipe, whereby cutting of the pipe and theft of the projector/display device is deterred.

12. The apparatus of claim 11 wherein the first and second internal end caps are in substantially abutting relationship to the inner surface of the pipe, the first and second internal end caps cooperating with the pipe in retaining the one or more reinforcing members within the bore while not interfering with the first and second external threads of the pipe.

13. The apparatus of claim 12 wherein the first and second internal end caps are substantially flat.

14. The apparatus of claim 12 wherein the first and second internal end caps are substantially continuous.

* * * * *